United States Patent [19]

Schulz et al.

[11] Patent Number: 4,864,919

[45] Date of Patent: Sep. 12, 1989

[54] VENT FOR AERATING WINDOWS

[75] Inventors: Joachim Schulz, Amorbach; Alfred Kern, Schneeberg, both of Fed. Rep. of Germany

[73] Assignee: Aurora Konrad G. Schulz GmbH & Co., Mudau/Odenwald, Fed. Rep. of Germany

[21] Appl. No.: 134,490

[22] Filed: Dec. 18, 1987

[30] Foreign Application Priority Data

Dec. 18, 1986 [DE] Fed. Rep. of Germany ....... 3643372

[51] Int. Cl.[4] ................................................ B60S 1/54
[52] U.S. Cl. ...................................... 98/2.09; 98/40.2
[58] Field of Search ................ 98/2, 2.08, 2.09, 91, 98/92, 40.2, 121.1

[56] References Cited

U.S. PATENT DOCUMENTS

| 2,096,901 | 10/1937 | Knecht | 98/2.09 |
| 2,154,731 | 4/1939 | Crowley | 98/2.09 |
| 2,544,182 | 3/1951 | Roberts | 98/121.1 |
| 3,177,794 | 4/1965 | Laing | 98/2.09 X |

FOREIGN PATENT DOCUMENTS

| 2338328 | 2/1975 | Fed. Rep. of Germany | 98/2.09 |
| 174009 | 10/1983 | Japan | 98/2.09 |
| 185311 | 10/1983 | Japan | 98/2.09 |

Primary Examiner—Harold Joyce
Attorney, Agent, or Firm—Becker & Becker, Inc.

[57] ABSTRACT

A narrow vent for aerating windshields of tractors, work machines, etc. The vent has a plurality of fins that spread the air stream that is directed onto a window in a fan-like manner. A portion of the fins, as side fins, are directed onto a region adjacent the vent, and the other portion of the fins, as main fins, are directed onto a region just ahead of the vent, with the angle provided by the fins corresponding approximately to a quarter circle. The air-exit plane provided by the vent extends at most insignificantly beyond the vehicle body part in which the vent is installed. All of the fins are partially recessed in the vent. The side fins are longer, and the outermost side fin is considerably longer, than the main fins. The outermost side fin is provided with a guide surface that faces the air-supply side extends at an obtuse angle relative to the air-exit plane, with the projection of this guide surface onto the air-exit plane representing an overproportionate part of the total surface area of this guide surface.

19 Claims, 2 Drawing Sheets

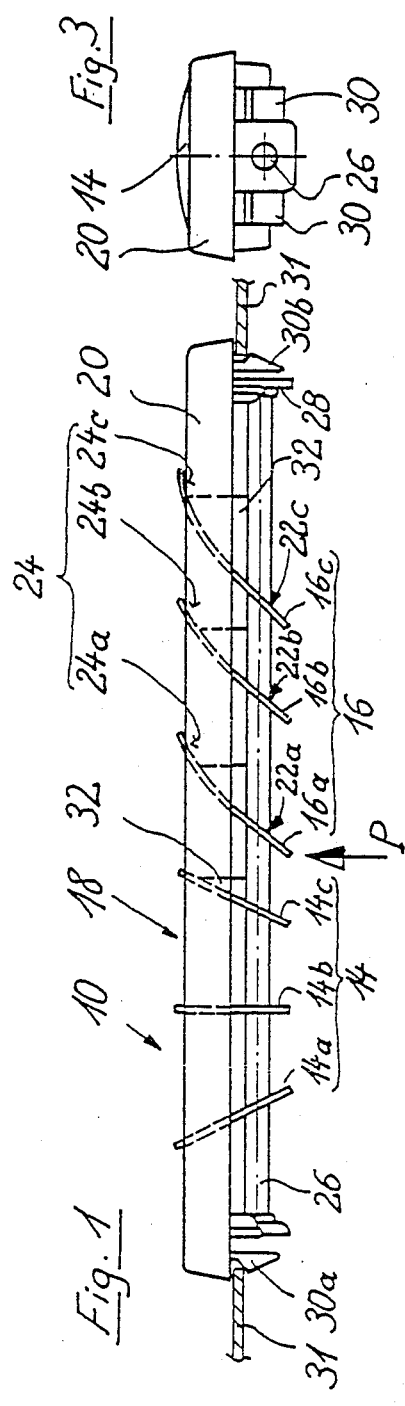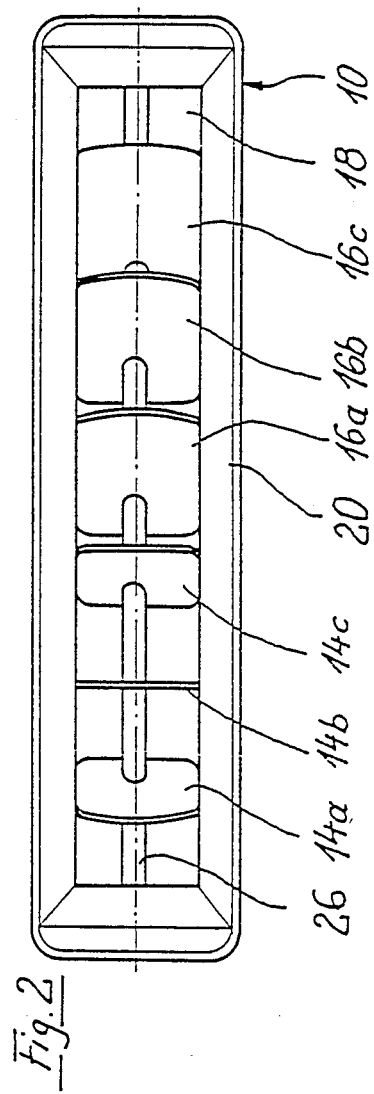

VENT FOR AERATING WINDOWS

BACKGROUND OF THE INVENTION

The present invention relates to a narrow vent for the aeration of windows, especially windshields, of tractors, work machines, etc. The vent includes a plurality of fins that spread the air stream that is directed onto a window in a fanlike manner. A portion of the fins, designated as side fins, is located as directed onto a region adjacent to the vent, while the other portion of the fins, designated as main fins, is located as directed onto a region just ahead of the vent. The zone of aeration provided by the fins covers approximately a quarter of a circle.

A vent of this type has many uses, since the exiting flow approximately covers a quarter of a circle. Thus, for example, it is known to dispose a respective one of such a quarter-circle vents to the right and to the left below a windshield. However, the heretofore known vents have a relatively great height above the surface, so that in this region a portion of the windshield is covered up. In addition, a vent that covers the inside of the windshield is not very aesthetically pleasing.

It is also known to dispose a vent in the middle at the lower edge of the windshield, with this vent being intended to cover approximately 180°. However, this heretofore known vent does not provide as much flexibility. For example, if a single windshield wiper is to be provided, a vent of this type cannot be used because the place required for it is taken up by the wiper motor.

It has also been attempted to achieve flow dynamic and aesthetic advantages by providing an orifice plate parallel to the bottom edge of the windshield; this orifice plate is intended to cover the fins of the vent. However, such a vent then takes up nearly the entire bottom edge of the windshield, and is relatively ugly. Despite the complicated and expensive construction, the flow velocity of such vents is low in the bottom corners of the windshield.

Completely recessed vents are also known. Due to the special configuration of the fins, these vents provide a surprisingly great air flow in the region of the bottom corners of the windshield, and are thus designated at 180° vents. However, it is still desirable to be able to supply more air to these regions under unfavorable operating conditions.

A further problem, which up to now has not been satisfactorily resolved, is the supply of a sufficient quantity of air to the viewing region. With nearly all of the heretofore known vents, the viewing region directly in front of the vents is supplied with a sufficient quantity of air, but the side regions do not receive enough air. The reason for this is that the air flow is generally spread in a fan-like manner. It would be particularly desirable if in the viewing region along the side edges of the windshield, the viewing region in the pertaining adjoining side windows could also be kept free of fog or the like, since the side-view mirrors are generally mounted on the other side of these side windows. For this purpose, supplemental vents are frequently provided, or a plurality of so-called fishtail vents are used.

In summary then, all of the heretofore known measures are relatively complicated and expensive, and require far too much air in order to achieve the desired effect.

It is therefore an object of the present invention to provide a vent of the aforementioned general type that does not too greatly restrict the designer from an aesthetic standpoint yet makes it possible to achieve a very satisfactory air flow velocity in the side corners of the windows even when the vent is disposed at a distnce from these corners. In addition, the air flow to the side of the vent should be particularly great in the viewing region.

BRIEF DESCRIPTION OF THE DRAWING

These and other objects and advantages of the present invention will appear more clearly from the following specification in conjunction with the accompanying schematic drawings, in which:

FIG. 1 is a side view of one exemplary embodiment of the inventive vent in the installed state;

FIG. 2 is a plan view of the vent of FIG. 1;

FIG. 3 is an end view of the vent of FIG. 1;

SUMMARY OF THE INVENTION

Figure 4:
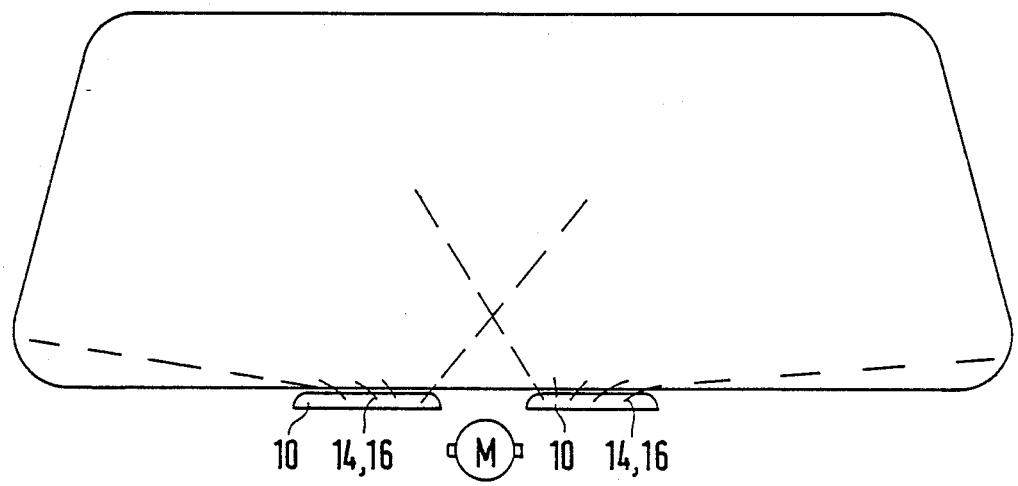
FIG. 4 is a schematic plan view of the inventive vent arranged for aeration of windows.

The vent of the present invention is characterized primarily in that: the vent has an elongated air-exit plane; all of the fins are partially recessed in a vent frame; the side fins are longer, and the outermost side fin is considerably longer, than the main fins; and the outermost side fin has a guide surface that faces the air-supply side and extends at an obtuse angle relative to the air-exit plane of the vent, with the projection of this guide surface onto the air-exit plane providing an overproportionate part of the total surface area of the guide surface.

A primary advantage of this inventive proposal is that such a vent can be used universally. Due to the guide surface of the outer side fin, which guide surface is large in comparison to the other fins, a relatively large proportion of the available air glides along the outer side fin, regardless of the flow angle of the vent, where it is available for supply to the outer lower corners of the windshield. This novel configuration, with partial recessing of the fins, makes it possible not only to take into account aesthetic viewpoints, but also to maintain favorable flow values in the critical regions. For this purpose, it is necessary to maintain an obtuse or flat angle, especially in the end region of the fins. Surprisingly, with the inventive arrangement a relatively high air flow of, for example, 1.7 m per second can be achieved in the outermost lower corners of a windshield.

Surprising advantages can be achieved with further advantageous inventive embodiments. For example, two, and especially three, side fins can be provided, with the inwardly disposed side fins extending less steeply than the outermost side fin. These inner side fins can be provided with air guide surfaces that comprise an essentially flat or planar portion and an end region that is bent outwardly, in other words in the direction toward the outermost side fin, with the degree of bending being less than that of the outermost side fin. Where three side fins are provided, the angle between the guide surfaces of the innermost and the central side fins is greater than the angle between the guide surfaces of the central and the outermost side fins. The end regions of the innermost and central side fins can be nearly parallel, so that the air flow along the inner side fin is deflected more in an outward direction than is the air flow along the central side fin. The radius of the curvature of the end surface of the central side fin can be greater than the respective radii of the innermost and outermost side fins. With this features, a flow can be achieved in the region of the side mirror that is considerably greater than would be initially expected. The important thing in this connection is that the more inwardly disposed air stream between the innermost and central side fins is to be directed onto the more outwardly disposed flow between the central and outermost side fins, with this last-mentioned flow being guided more evently. This is accomplished with the aforementioned inventive features.

Where six fins are provided, namely three main fins and three side fins, the following approximate angular relationships relative to the air-exit plane, as measured from that end of the vent frame remote from the outermost side fin, are provided, in degrees:

|  |  | In-flow guide surface | End region |
| --- | --- | --- | --- |
| Inner main fin | (14a) | 115 | 115 |
| Central main fin | (14b) | 90 | 90 |
| Outer main fin | (14c) | 65 | 65 |
| Inner side fin | (16a) | 55 | 28,5 |
| Central side fin | (16b) | 40 | 27 |
| Outer side fin | (16c) | 35 | 3 |

Pursuant to another inventive embodiment, in the region of the air-exit plane, more than half of the surface area of the side fins is covered, while in the in-flow region, considerably more than half of the total in-flow surface area of the side fins is covered.

Pursuant to a preferred embodiment of the present invention, two vents can be disposed next to one another, with the quarter circles provided by the fins of these vents being directed away from one another. With such an arrangement, the windshield of a tractor, a work machine, or some other vehicle is completely covered. For buses and other vehicles that have wide windshields, the vents can be provided in the middle along the lower edge of the windshield, with at least one further vent being provided along the lower edge of the windshield considerably away from the middle. This additional vent, which can be disposed near the right and/or left lower edge of the windshield, is oriented in such a way that the quarter circle provided by the fins of this vent sweeps the side window adjacent the windshield.

Where two vents are provided, these vents can be completely symmetrical relative to one another. In such a case, it is particularly advantageous that additionally provided lateral vents, although they also supply a flow of air to the appropriate part of the windshield, especially act on the side windows, so that the viewing region of the latter is kept clear. The nearly 90° deflection of the generated air flow that must be achieved in order to reach the side windows is readily possible, because the air flow with this inventive embodiment is directed against this region in such a concentrated manner that the air can reach the side windows even where corner columns exist that create unfavorable flow dynamics. This is particularly true for the customary flat corner columns.

The arrangement of the vents can be selected in such a way that a pronounced overlapping zone results in the middle. This is accomplished by installing the nozzles in pairs directly adjacent one another or, where a windshield washer motor is mounted between the vents, disposing a pair of vents at an appropriate distance from one another. In both cases, a sufficient air flow is provided in the central region. This is true because a given vent actually covers somewhat more than a quarter circle, namely aproximately 120°.

All of the vents that are used can be connected to the same flow channel, especially to a warm-air flow channel. This flow channel can be formed by arranging a hollow space directly below the windshield, with the vents being placed in openings in the vehicle body part above this hollow space.

Further specific features of the present invention will be described in detail subsequently.

DESCRIPTION OF PREFERRED EMBODIMENTS

Figure 5:
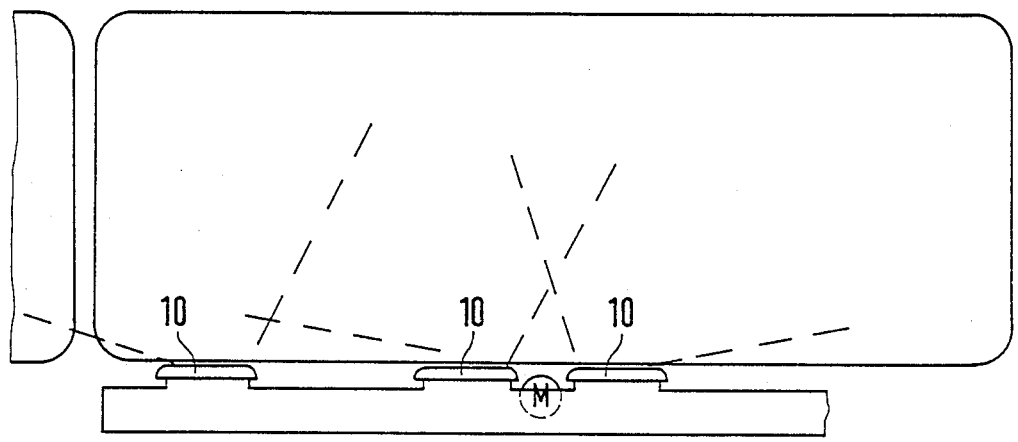
FIG. 5 is a further schematic plan view of the inventive vent arranged for aeration of windows.

Referring now to the drawing in detail, FIG. 1 shows a side view of one exemplary embodiment of the inventive nozzle or vent 10. The vent 10 is provided with six disks or fins, three of which are designed as main fins 14, and three of which are designed as side fins 16. The main fins 14 differ from the side fins 16 in that they have a different angle relative to an air-exit plane 18. The main fins 14 serve for supplying air to the windshield in the region directly in front of the vent 10 as shown in FIG. 4 as well as in FIG. 5, while the side fins 16 are responsible for the regions to the sides of the vent. As can be seen from the drawing, all of the fins 14, 16 extend only slightly beyond the airexit plane 18, for example by a fraction of a millimeter or by at most a few millimeters. The fins are disposed in a vent frame 20, and are supplied with warm and/or cold air in the direction of the arrow P.

Each of the fins 14, 16 has a different angle relative to the air-exit plane 18. The inner main fin 14a is the only fin that is directed toward the left in the drawing. The central main fin 14b extends at right angles to the air-exit plane 18. The outer main fin 14c is directed to the right at the same angle at which the inner main fin 14a is directed toward the left.

The inner side fin 16a is already directed considerably more toward the side regions than is the outer main fin 14c. Whereas the main fins 14a to 14c are all linear, the side fins 16a to 16c are bent outwardly, so that the air flow that is guided along the side fins in each case receives an outwardly directed impulse shortly before leaving the end region of the fins. Each of the side fins 16a to 16c has guide surfaces 22a to 22c along which the air flow glides. While the slope or inclination of the guide surfaces 22a to 22c relative to the air-exit plane 18 decreases continuously from the inside toward the outside, the same is not true for the respective end regions 24a to 24c of the fins 16.

The end region 24a of the inner side fin 16a is bent relatively greatly in an outward direction, whereas the end region 24b of the central side fin 16b is bent less greatly in an outward direction. In this way, an essentially laminar flow results at the guide surface 22b, with this laminar flow essentially retaining its direction as it exits the vent and, upon appropriate installation of the vent, being directed against a region that corresponds to the lateral viewing region or to the region of the side-view mirror. This flow is reinforced by the large curvature of the end region 24a of the side fin 16a. In this way, the pertaining individual air flow receives a great outward impulse that reinforces this flow.

Due to the novel configuration of the outer side fin 16c, the flow velocity of the air in the region of the lower corners of the side window is relatively great. It is advantageous to make the guide surface 22c of the outer side fin 16c larger than is shown in the embodiment of FIG. 1, and to have the side fin 16c extend at a flatter angle relative to the air-exit plane 18 than is shown in FIG. 1. In this way, a relatively large portion of the flow is shunted off for the lower corners of the window, thus achieving an adequate aeration at these locations.

In the embodiment illustrated in FIG. 1, the fins 14, 16 are mounted on a support rod 26 that fixes the position of the fins exactly. The support rod 26 passes through each of the guide surfaces of the fins. The support rod 26 is preferably integrally formed with the fins 14, 16 and is mounted in the vent frame 20 via an arresting connection 28. The vent frame 20, in turn, is provided with arresting tabs 30a and 30b that are integrally formed thereon and serve for securing the vent frame 20 in an opening in the pertaining part 31 of the vehicle, generally on the instrument panel or dashboard. It is also possible to provide a screw connection in place of the arresting tabs 30a, 30b.

The vent frame 20 rests completely upon the vehicle body part 31, and extends only a few millimeters, for example about 8 mm, out of the part 31. It is particularly advantageous to have guidance of the flow be effected along the recessed surfaces 22a to 22c, so that only the last orientation of the flow in the end regions 24a to 24c has to be effected above the air-exit plane 18. With regard to flow dynamics, the end regions 24a to 24c are advantageously not bent too greatly relative to the guide surfaces 22a to 22c.

Viewed as a whole, the vent 10 of the present invention offers relatively little resistance to flow.

By providing ribs 32 between the support rod 26 and the fins for stabilization, a stable and impact-resistant configuration as well as a vibration-free disposition of the fins is assured despite the fact that little material is used. At the same time, the ribs 32 and the fins reduce the tendency toward formation of secondary turbulence. The sides of the fins 14, 16 are dispsoed along the vent frame 20. In this way, an additional lateral stabilization of the fins is achieved. Furthermore, the vent frame 20 results in a nozzle effect that contributes to the acceleration of the flow.

To secure the vent frame 20 to the part 31 of the vehicle body, a total of four arresting tabs 30 are provided, with total of these tabs being illustrated in FIG. 3. FIG. 3 also shows that on the exit side, the fins are slightly rounded, which in addition to aesthetic reasons also offers further flow dynamic advantages and reduces the danger of injury.

Various modifications of the vent, while still staying within the scope of the present invention, are also possible. For example, a different number of fins can be used, and/or the dimensions of the fins can be modified to conform to various requirements. It is also possible to reduce the size of the vent frame 20 even further, so that the air-exit plane 18 coincides directly with the vehicle body part 31. Furthermore, it would be possible, for example, to convert the outer main fin 14c to a side fin and to direct it toward the region of the side mirror. In so doing, the orientation of the fin 14c would correspond approximately to that of the inner side fin 16a. In this case, two main fins 14a and 14b only would be provided, with these main fins each being expediently inclined somewhat further in an outward direction than the orientation illustrated in FIG. 1.

The vent arrangement of the present invention could also be used in conjunction with a roof vent. In such a case, the vents would be disposed along the upper edge of the window.

The present invention is, of course, in no way restricted to the specific disclosure of the specification and drawing, but also encompasses any modifications within the scope of the appended claims.

What we claim is:

1. In a vent for the aeration of windows, especially windshields, of tractors, work machines, etc., said vent including a plurality of fins that spread the air stream that is directed onto a window or windows in a fan-like manner, with a first portion of said fins, designated as side fins, being directed onto a region adjacent said vent, and with a second portion of said fins, designated as main fins, being directed onto a region just ahead of said vent, whereby the zone of aeration provided by said fins covers approximately a quarter of a circle, the improvement in combination therewith wherein:

a vent frame is provided in which all of said fins are at least partially recessed and lowered in a sucken location with respect to said vent frame, with said vent frame being elongated and having a first and second end, whereby an elongated air-exit plane is provided for air passing through said vent, with said air entering said vent from an air-inlet side thereof that is remote from said air-exit plane, and with said fins extending from the vicinity of said air-inlet side of said vent to the vicinity of said air-exit plane thereof; said side fins are disposed closer to said second end of said vent frame, and said main fins are disposed closer to said first end thereof, with said side fins being longer, and that side fin that is closest to said second end of said vent frame being designated the outermost side fin and being considerably longer, than said main fins; and with said outermost side fin having a guide surface that faces said air-inlet side of said vent and extends at an obtuse angle relative to said air-exit plane, with a projection of said guide surface onto said air-exit plane representing an overproportionate part of the total surface area of this guide surface.

2. In a vent for the aeration of windows, especially windshields, of tractors, work machines, etc., said vent including a plurality of fins that spread the air stream that is directed onto a window or windows in a fan-like manner, with a first portion of said fins, as side fins, being directed onto a region adjacent said vent, and with a second portion of said fins, as main fins, being directed onto a region just ahead of said vent, thereby the zone of aeration provided by said fins covers approximately a quarter of a circle, the improvement wherein:

a vent frame is provided in which all of said fins are at least partially recessed, with said vent frame being elongated and having a first and second end, whereby an elongated air-exit plane is provided for air passing through said vent, with said air entering said vent from an air-inlet side thereof that is remote from said air-exit plane, and with said fins extending from the vicinity of said air-inlet side of said vent to the vicinity of said air-exit plane thereof; said side fins are disposed closer to said second end of said vent frame, and said main fins are disposed closer to said first end thereof, with said side fins being longer, and that side fin that is closest to said second end of said vent frame being designated the outermost side fin and being considerably longer, than said main fins; and with said outermost side fin having a guide surface that faces said air-inlet side of said vent and extends at an obtuse angle relative to said air-exit plane, with a projection of said guide surface onto said air-exit plane representing an overproportionate part of the total surface area of this guide surface;

a support rod on which said fins are mounted, with said support rod passing through guide surfaces of said fins; and ribs for stabilization, with said ribs extending between said guide surfaces of said fins and said support rod downstream of the latter.

3. A vent according to claim 2, in which said outermost side fin has an end region, remote from said air-inlet side of said vent, that is curved toward said second end of said vent frame; prior to said end region, when considered in the direction of flow, said guide surface of said outermost side fin extends in a substantially planar manner.

4. A vent according to claim 3, which includes at least two side fins, with those side fins disposed inwardly of said outermost side fin being disposed at slightly less of an obtuse angle, i.e. being more inclined, that is said outermost side fin, with these inwardly disposed side fins being provided with respective air guide surfaces, that are essentially planar, and end regions that are curved toward said second end of said vent frame, but to less of an extent than the curvature of said end region of said outermost side fin.

5. A vent according to claim 4, which includes three side fins, with the angle between said guide surfaces of the innermost one of said side fins and of the central one of said side fins is greater than the angle between said guide surfaces of said central side fin and said outermost side fin, and with said end regions of said innermost and central side fins extending nearly parallel to one another, so that an air flow along said innermost side fin is deflected more toward said second end of said vent frame than is an air flow along said central side fin.

6. A vent according to claim 5, in which the radius of curvature of said end region of said central side fin is greater than the respective radii of curvature of said end regions of said innermost and outermost side fins.

7. A vent according to claim 5, which includes three main fins and three side fins, with an innermost one of said main fins being disposed closest to said first end of said vent frame, and with the approximate angular relationships, in degrees, of said fins relative to said air-exit plane of said vent, as measured from said first end of said vent frame, being as follows:

|  | In-flow guide surface | End region |
| --- | --- | --- |
| Innermost main fin | 115 | 115 |
| Central main fin | 90 | 90 |
| Outermost main fin | 65 | 65 |
| Innermost side fin | 55 | 28,5 |
| Central side fin | 40 | 27 |
| Outermost side fin | 35 | 3 |

8. A vent according to claim, in which said support rod is adapted to be arrested in said vent frame, which has a smooth surface, remote from said air-inlet side of said vent, in which an essentially rectangular opening is provided for receiving said fins, with said opening forming said air-exit plane, and with the width of said fins being such that they rest against the sides of said vent frame in said opening thereof.

9. A vent according to claim 2, in which in the vicinity of said air-exit plane more than half of the surface area of said side fins is covered, and in the vicinity of said air-inlet side of said vent, consdierably more than half of the entire inflow guide surface on said side fins is covered.

10. A vent according to claim 2, in which said fins, remote from said air-inlet side of said vent, are slightly rounded, with the overall height of said vent being essentially the same in the vicinity of all of said fins.

11. A vent arrangement utilizing vents as defined in claim 2, and including two such vents disposed next to one another, with the quarter circle provided by said fins of one of said vents being directed away from said quarter circle provided by said fins of the other of said vents.

12. A vent arrangement according to claim 11, with said two vents being disposed in the middle along the lower edge of a relatively wide windshield; and in which at least one additional vent is disposed along the lower edge of said windshield at quite a distance from the center of the latter, with said at least one additional vent being directed in such a way that the quarter circle provided by said fins thereof sweeps a side window that is adjacent said windshield.

13. A vent arrangement according to claim 11, in which said two vents are spaced slightly apart so that an overlap zone of the air flows from these vents results, enabling a greater quantity of air to be supplied to a window.

14. A vent arrangement according to claim 11, in which said two vents are spaced apart by a distance great enough to allow a windshield wiper motor to be disposed between them.

15. A vent arrangement according to claim 11, in which said vents are completely symmetrical.

16. A vent arrangement according to claim 11, in which all of said vents communicate with a common flow channel, especially a warm-air flow channel.

17. A vent arrangement according to claim 16, in which said flow channel is formed by a hollow space provided directly below a windshield, with said vents being installed above said hollow space in openings of a part of a vehicle body.

18. A vent arrangement according to claim 17, in which said air-exit planes of said vents extend at most only slightly beyond said vehicle body part.

19. A vent arrangement utilizing vents as defined in claim 7, and including at least two of such vents, with said vents being disposed next to one another in such a way that an overlapping of air flows occurs in the viewing region of a window, i.e. approximately halfway up the window.

* * * * *